Sept. 3, 1929.  C. HOERL  1,726,562
REGULATABLE CENTRIFUGAL CLUTCH
Filed Oct. 4, 1927  2 Sheets-Sheet 1
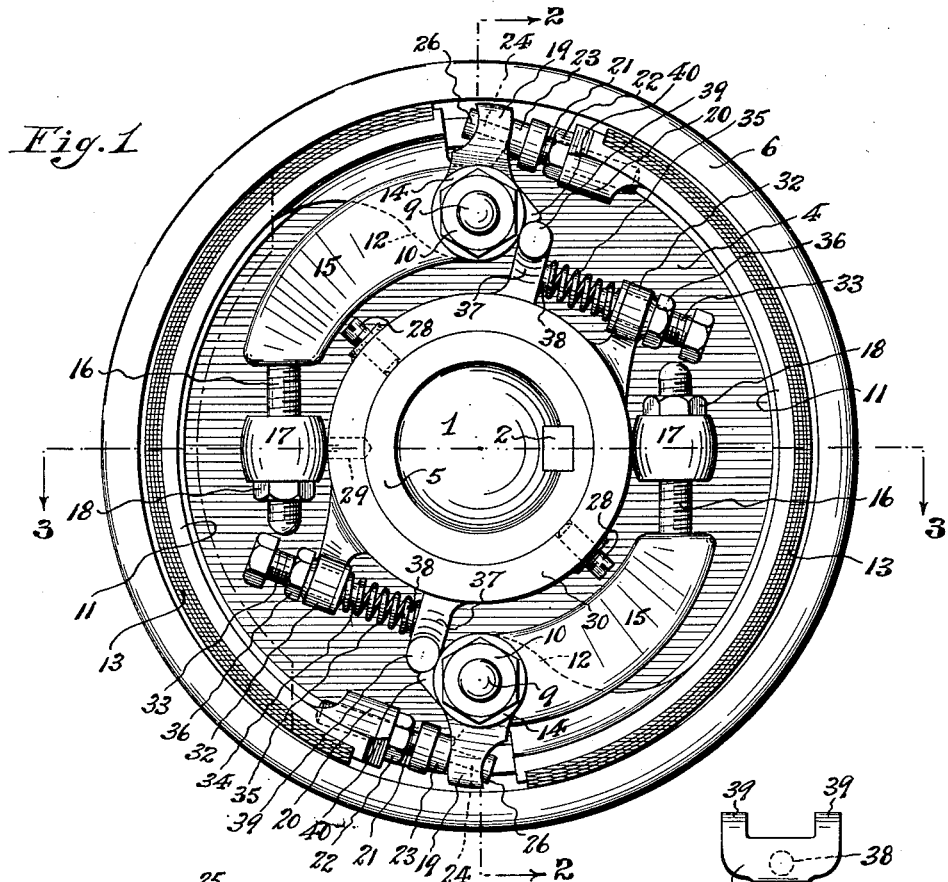
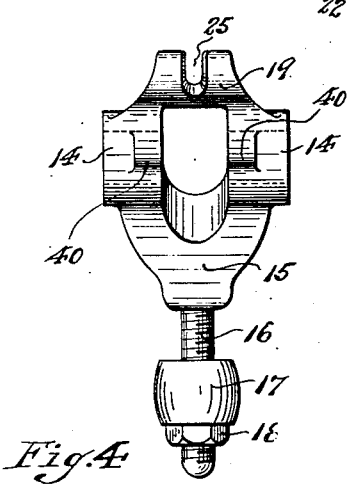
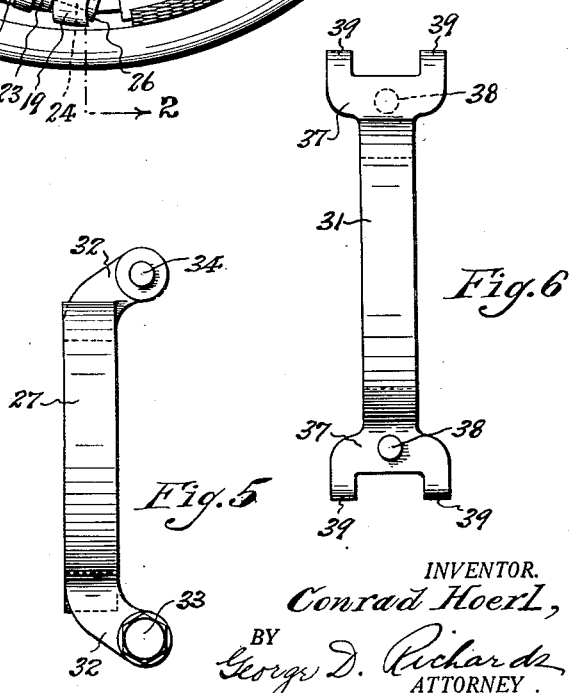
INVENTOR.
Conrad Hoerl,
BY
George D. Richards
ATTORNEY.

Sept. 3, 1929.  C. HOERL  1,726,562
REGULATABLE CENTRIFUGAL CLUTCH
Filed Oct. 4, 1927  2 Sheets-Sheet 2
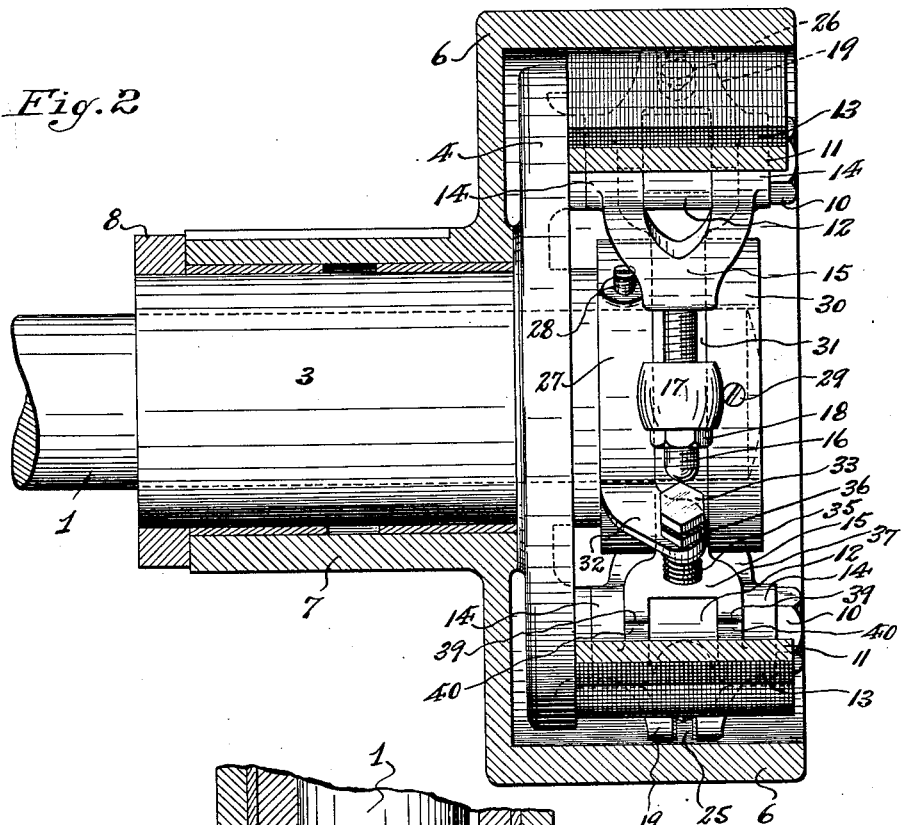
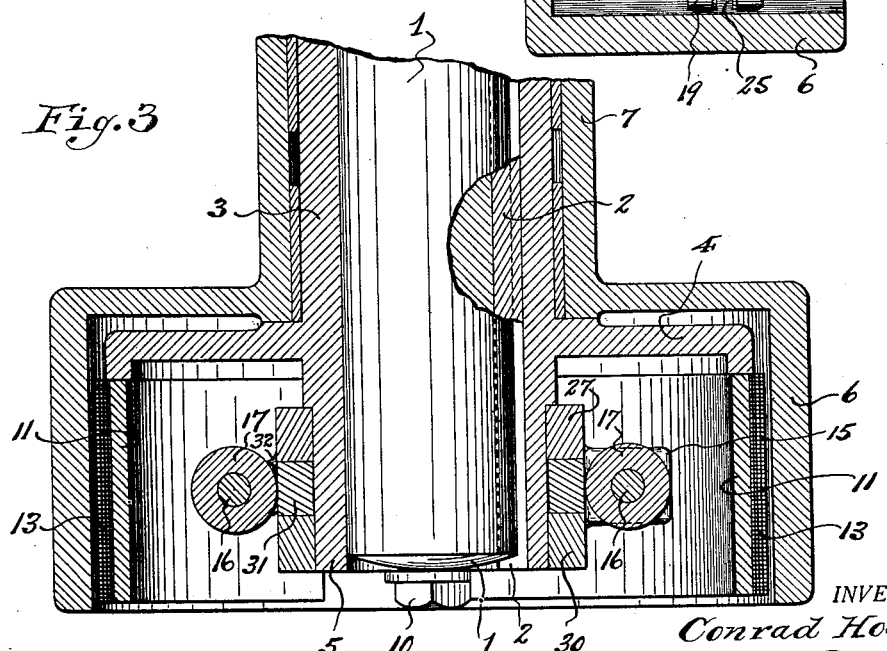
INVENTOR.
Conrad Hoerl,
BY George D. Richards
ATTORNEY.

Patented Sept. 3, 1929.

1,726,562

UNITED STATES PATENT OFFICE.

CONRAD HOERL, OF NEWARK, NEW JERSEY.

REGULATABLE CENTRIFUGAL CLUTCH.

Application filed October 4, 1927. Serial No. 223,883.

This invention relates, generally, to improvements in power transmission clutches; and the invention has reference, more particularly, to a novel construction of regulatable centrifugally actuated clutch adapted to automatically move into clutching condition at predetermined speeds or R. P. M., and to automatically release itself on diminution of speed below a predetermined speed or R. P. M.

In transmitting power from a prime mover, such e. g. as an electric motor, it is highly desirable to permit the prime mover to attain a predetermined speed before throwing on the load, and conversely to release the load upon undue diminution of speed below normal to permit recovery of normal speed. It is therefore the principal object of this invention to provide a novel and simple construction of centrifugally actuated clutch mechanism which automatically becomes operative when the clutching elements are rotated by the source of power at a predetermined speed or R. P. M., and which upon loss of normal speed will automatically release the load until recovery of desired predetermined speed is attained.

The invention also has for a further object to provide a novel and simple means for adjusting or regulating the centrifugally actuated clutch elements to control the same for operation at selective speeds or R. P. M., and finally the invention seeks to provide an improved mechanical construction, arrangement and correlation of parts making up the novel regulatable centrifugal clutch mechanism, whereby smooth and efficient operation is assured.

Other objects of this invention, not at this time more particularly enumerated, will be clearly understood from the following detailed description of the same.

The invention is clearly illustrated in the accompanying drawings, in which:—

Fig. 1 is an end elevation or face view of the novel clutch made according to and embodying the principles of this invention; Fig. 2 is a vertical sectional view taken on line 2—2 in Fig. 1; Fig. 3 is a transverse sectional view, taken on line 3—3 in Fig. 1; Fig. 4 is an end elevation of a clutch operating lever dismounted from the clutch assembly; Fig. 5 is a side elevation of the regulating collar, and Fig. 6 is a side elevation of the release ring of the clutch mechanism.

Similar characters of reference are employed in all of the hereinabove described views, to indicate corresponding parts.

Referring now to said drawings, the reference character 1 indicates a power transmission shaft, such e. g. as the armature or rotor shaft of an electric motor, or any other shaft directly or indirectly driven by an electric motor or other form of prime mover. Affixed to said shaft 1 by a key 2, is the sleeve 3 having intermediate its ends an annular flange or carrier plate 4, and beyond the latter a hub portion 5 of reduced diameter.

The reference character 6 indicates a friction drum provided with a hub member 7 rotatably mounted on said sleeve 3 behind said carrier plate 4, and all so arranged that said drum is concentric to and encloses said carrier plate 4 and the hub portion 5; said drum constituting the driven member of the clutch mechanism. Said drum is held in assembled relation to said carrier plate 4 and its sleeve 3 by a keeper collar 8 which is suitably secured upon the end of the sleeve 3 to abut the hub member 7 of said drum 6.

Supported by said carrier plate 4 are a pair of diametrically opposite outwardly projecting fulcrum studs 9, having threaded free ends to receive retaining nuts 10. The reference character 11 indicates a pair of expansible clutch-members, each being provided at one of their ends with an eccentric pivoting knuckle 12 which are respectively pivotally engaged on said respective fulcrum studs 9 so as to be retained in such assembled relation by said nuts 10, and so that said clutch members extend around and are opposed to the inner surface of the friction drum 6; the free end of one clutch member terminating adjacent to but short of the pivoted end of the other. Secured upon the outer face of each clutch member 11 is a friction band or lining 13, preferably made of woven asbestos fabric or other suitable material.

Fulcrumed on said studs 9 by means of bifurcated bearing portions 14, which straddle the pivoting knuckles 12 of the clutch members 11, are clutch member actuating levers 15. Said levers 15 are provided at their free ends with screw threaded shanks 16 upon which are adjustably engaged weight members 17, the latter being locked in desired adjusted position by lock-nuts 18 which are threaded on said shanks 16. Extending outwardly from the bearing portions 14 of said actuating levers 15 are thrust cam-portions 19, the same being so disposed as to be opposed to the free ends of said clutch members 11. The free end of each clutch member 11 is provided with a centrally disposed longitudinally directed boss 20 having a longitudinally internally threaded opening to receive and adjustably dispose a threaded stud 21 adapted to be locked in adjusted relation to said boss 20 by a lock-nut 22. Fixed on the outer extremity of each stud 21 is a thrust button 23 engageable by the opposed cam-portion 19 of the adjacent actuating lever 15, whereby outward movement of the latter will move said cam-portion with thrusting effect against said thrust button 23 to thereby expand the associated clutch-member 11 and thus carry the same into operative gripping or clutching relation to the drum 6. Said thrust button 23 is also provided with a stem 24 which is engaged through an indented slot 25 formed in the extremity of said cam-portion 19, said stem 24 having at its free end a head 26 which engages the rear side of said cam-portion, whereby inward movement of the actuating lever 15 will retract said cam-portion with pulling effect upon said head 26 to thereby contract the associated clutch member 11 and thus carry the same to released or non-clutching relation to the drum 6.

Mounted on the inner part of said hub portion 5 of said carrier plate 4 is a fixed regulating ring 27 held in operative position by set-screws 28, and also fixed on the outer end of said hub portion 5 by a set screw 29 or other suitable fastening means is a keeper ring 30, while rotatably movable on said hub portion 5 between said regulating ring 27 and keeper ring 30 is a release ring 31. Said regulating ring 27 is provided, at opposite sides thereof, with outwardly extending forwardly off-set arms 32 provided adjacent their extremities with internally screw-threaded openings in which are adjustably engaged tension adjusting screws 33 provided at their free ends with seating studs 34 to support tension springs 35. Said adjusting screws 33 may be secured in desired spring tension adjusting position by means of lock-nuts 36. The release ring 31 is provided, at opposite sides thereof, with outwardly projecting abutments 37 to which said arms 32 of the regulating ring are opposed, and said abutments 37 are provided, on the faces thereof which are opposite said arms 32 of the regulating ring, with seating studs 38 upon which are engaged the opposite ends of said tension springs 35, whereby said springs exert a yielding pressure upon said abutments 37 of said release ring 31. The free ends of the abutments 37 of said release ring 31 are bifurcated to form check fingers 39. Formed in connection with the pivoted ends of said actuating levers 15, and preferably on the rear sides of the bearing portions 14 of the latter are stop projections or nosings 40 which are normally but yieldably engaged by said check fingers 39 of the release ring 31 when said actuating levers 15 occupy inactive or clutch-member releasing position (as shown in Fig. 1).

In the operation of the clutch mechanism, the actuating levers 15 are held in inactive or clutch member releasing position by the pressure of the check fingers 39 of the release ring 31, since the latter is rotated on the hub portion 5 toward said levers by the thrust of the springs 35, thereby forcing the check fingers 39 into holding engagement with the stop projections or nosings 40. When power is applied to the clutch mechanism through the driving shaft 1, the carrier plate 4, upon which the clutching devices and their actuating means are supported, is rotated by the shaft. As the speed of rotation increases the weighted actuating levers 15 are subjected to an increasing centrifugal force as they are carried around with the carrier plate. Such centrifugal force tends to compel outward movement of the weighted ends of the actuating levers 15, whereby the same tend to turn on the fulcrum studs 9. This tendency to outward turning movement of said actuating levers 15 under the effects of centrifugal force is initially restrained or impeded by the pressure of the spring thrust release ring 31 tending to maintain the check fingers 39 in movement obstructing engagement with the stop projections or nosings 40 of the actuating levers 15. The degree of actuating lever movement obstructing pressure is governed by the adjustment of the tension of the springs 35. Before the actuating levers 15 can function under the compulsion of centrifugal force, the tension of the springs 35 must be overcome; in other words the effect of centrifugal force must first accumulate under the pick-up of speed of the shaft 1 as driven by the prime mover until the desired predetermined R. P. M. is attained at which such centrifugal force overcomes the resistance of the applied pressure of the springs 35, and thereupon permits the actuating levers 15 to swing outwardly so as to cause the cam-portions 19 thereof to thrust upon the free ends of the clutch-members 11 through the interconnecting parts, and thus expand said clutch-members 11 to effect clutching or gripping relation to the clutch drum 6. When the levers 15 thus swing outward, the nosings 40 ride upon the check-fingers 39 to press back the abutments 37 against the springs 35, the release ring 31 rotatably yielding to such movement. If, after clutched relation of the clutch-members 11 and drum 6 is thus attained, the speed of the shaft 1 diminishes under load so as to fall below the desired predetermined R. P. M., thereupon the tension of the springs 35 will overcome the diminished centrifugal force effective upon the actuating levers 15, and the pressure of the springs 35 will produce a forward rotation of the release ring 31 whereby the check fingers will press upon the nosings 40 to return the same to normal initial position, thereby turning the actuating levers 15 on their fulcrums to retract the same to inactive positions. Such retraction of the levers 15 will cause the cam-portions 19 to draw back the free ends of the clutch members 11, whereupon the latter are released from clutching or gripping relation to the drum 6, until such time as the prime mover and shaft 1 driven thereby regains desired operative speed or predetermined R. P. M. From the above it will be obvious that the clutch is fully automatic, and is controlled by its rotation at a desired predetermined speed, above which speed it maintains clutched or active condition and below which speed it quickly moves to released or inactive condition. A clutch of this character is especially useful in transmitting power desired from electric motors, since it both allows the motor to pick-up a desired normal operating speed before subjecting it to load, and also functions to release load under diminished speed to allow the motor to regain normal speed. From the above description and an inspection of the accompanying drawings it will also be apparent that I have provided a very simple, compact and readily adjustable clutch mechanism the functioning of which is controlled by centrifugal force in a very efficient manner.

The clutch drum 6 may be utilized as the power transmission element of the clutch mechanism, preferably by mounting on the hub-member 7 thereof a pulley, gear wheel or other suitable transmission element (not shown).

As many changes could be made in the above described construction and many widely different embodiments of this invention could be made without departing from the scope thereof, it is intended that all matter contained in the above description or shown in the accompanying drawings shall be interpreted as illustrative and not in a limiting sense.

I claim:—

1. In a clutch mechanism, a rotatable friction drum, a carrier-plate rotatably mounted within said drum, eccentrically pivoted expansible clutch members carried by said carrier-plate and movable into clutching relation to said drum, centrifugally actuated operating levers also pivotally supported by said carrier-plate, each operating lever having a thrust cam operatively related to the free end of one of said clutch members, each operating lever also having a stop projection, and tensional detent means carried with said carrier-plate and cooperating with said stop projections of said operating levers to hold the same inactive at R. P. M. speeds of said carrier-plate less than a desired predetermined speed, and means for adusting the tension of said detent means.

2. In a clutch mechanism, a rotatable friction drum, a carrier-plate rotatably mounted within said drum, eccentrically pivoted expansible clutch-members carried by said carrier-plate and movable into clutching relation to said drum, centrifugally actuated operating levers also pivotally supported by said carrier-plate, each operating lever having a thrust cam operatively related to the free end of a clutch-member, each operating lever also having at its pivoted end a stop-projection, and a spring pressed release ring rotatable relative to said carrier-plate, said release ring having projecting check-fingers to engage said stop projections of said operating levers thereby to hold the latter inactive at R. P. M. speeds of said carrier-plate less than a desired predetermined speed.

3. In a clutch mechainsm, a rotatable friction drum, a carrier-plate rotatably mounted within said drum, said carrier-plate having a hub-portion extending axially through said drum interior, eccentrically pivoted expansible clutch-members carried by said carrier plate and movable into clutching relation to said drum, centrifugally actuated operating levers also pivotally supported by said carrier-plate adapted to expand said clutch members, each operating lever having at its pivoted end a stop projection, a release ring rotatable on said hub portion of said carrier-plate, said release ring having check fingers to engage said stop projections of the operating levers, spring means for yieldably holding said check-fingers in engagement with said stop projections, and means for adjusting said spring means.

4. In a clutch mechainsm, a rotatable friction drum, a carrier plate rotatably mounted within said drum, said carrier plate having a hub-portion extending axially through said drum interior, eccentrically pivoted expansible clutch members carried by said carrier plate and movable into clutching relation to said drum, centrifugally actuated operating levers also pivotally supported by said carrier plate adapted to expand said clutch-members, each operating lever having at its pivoted end a stop projection, a release ring rotatable on said hub-portion of said carrier-plate, said release ring having check-fingers to engage said stop-projections of said operating levers, spring means for yieldably holding said check-fingers in engagement with said stop-projections, a fixed ring on said hub-portion of said carrier-plate, abutments on said fixed ring, and tension adjusting means carried by said abutments and cooperating with said spring means.

5. In a clutch mechanism, a drive shaft, a carrier plate having a hub portion fixed on said shaft, a friction drum having a hub member rotatably mounted on the rearward extension of said carrier plate hub portion, said friction drum being concentric to and enclosing said carrier plate, eccentrically pivoted expansible clutch members carried by said carrier plate and movable into clutching relation to said drum, centrifugally actuated operating levers also pivotally supported by said carrier plate adapted to expand said clutch members into gripping relation to said drum, means for operatively coupling said operating levers with the free ends of said clutch members, said operating levers having at their pivoted ends stop projections, and adjustable spring actuated detent means carried with said carrier plate and adapted to engage said stop projections of said operating levers to hold the latter inactive at R. P. M. speeds of said drive shaft less than a desired predetermined speed.

6. In a clutch mechanism, a drive shaft, a carrier plate having a hub portion fixed on said shaft, a friction drum having a hub member rotatably mounted on the rearward extension of said carrier plate hub portion, said friction drum being concentric to and enclosing said carrier plate, eccentrically pivoted expansible clutch members carried by said carrier plate and movable into clutching relation to said drum, centrifugally actuated operating levers also pivotally supported by said carrier plate adapted to expand said clutch members into gripping relation to said drum, means for operatively coupling said operating levers with the free ends of said clutch members, said operating levers having at their pivoted ends stop projections, a release ring rotatable on the forward extension of said carrier plate hub portion, said release ring having check fingers to engage said stop projections of said operating levers, and spring means for yieldably holding said check fingers in engagement with said stop projections.

7. In a clutch mechanism, a drive shaft, a carrier plate having a hub portion fixed on said shaft, a friction drum having a hub member rotatably mounted on the rearward extension of said carrier plate hub portion, said friction drum being concentric to and enclosing said carrier plate, eccentrically pivoted expansible clutch members carried by said carrier plate and movable into clutching relation to said drum, centrifugally actuated operating levers also pivotally supported by said carrier plate adapted to expand said clutch members into gripping relation to said drum, means for operatively coupling said operating levers with the free ends of said clutch members, said operating levers having at their pivoted ends stop projections, a release ring rotatable on the forward extension of said carrier plate hub portion, said release ring having check fingers to engage said stop projections of said operating levers, and spring means for yieldably holding said check fingers in engagement with said stop projections, a fixed ring on said forward extension of said carrier plate hub portion, abutments on said fixed ring, and tension adjusting means carried by said abutments and cooperating with said spring means.

8. In a clutch mechanism, a rotatable friction drum, a carrier plate rotatably mounted within said friction drum, a pivoted clutch means carried by said carrier plate and movable into and out of clutched relation to said drum, a centrifugally actuated operating lever also pivoted on said carrier plate, means for operatively coupling said operating lever with the free end of said clutch means, said operating lever having at its pivoted end a stop projection, and an adjustable spring actuated detent means carried with said carrier plate and adapted to engage said stop projection of said operating lever to hold the latter inactive at R. P. M. speeds of said carrier plate less than a desired predetermined speed.

In testimony, that I claim the invention set forth above I have hereunto set my hand this 6th day of September, 1927.

CONRAD HOERL.